(12) United States Patent
Gessat et al.

(10) Patent No.: US 7,096,883 B2
(45) Date of Patent: Aug. 29, 2006

(54) COMBINED CHECK/PRESSURE CONTROL VALVE

(75) Inventors: Jochen Gessat, Brühl (DE); Michael Scholand, Wülfrath (DE); Martin Jordan, Düsseldorf (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 175 days.

(21) Appl. No.: 10/479,547

(22) PCT Filed: Mar. 3, 2003

(86) PCT No.: PCT/EP03/02159

§ 371 (c)(1),
(2), (4) Date: Dec. 3, 2003

(87) PCT Pub. No.: WO03/074912

PCT Pub. Date: Sep. 12, 2003

(65) Prior Publication Data

US 2004/0154666 A1     Aug. 12, 2004

(30) Foreign Application Priority Data

Mar. 5, 2002 (DE) .......................... 202 03 515 U

(51) Int. Cl.
*F16K 17/18* (2006.01)

(52) U.S. Cl. .............................. 137/493.8; 137/493.9; 137/539

(58) Field of Classification Search ............... 137/493, 137/493.8, 493.9, 539, 375, 543.19
See application file for complete search history.

(56) References Cited

U.S. PATENT DOCUMENTS

| | | | | |
|---|---|---|---|---|
| 3,304,952 A | * | 2/1967 | Krone ...................... | 137/493.9 |
| 3,613,718 A | | 10/1971 | Ballinger ................... | 137/493 |
| 3,661,128 A | * | 5/1972 | Eshelman .................... | 137/480 |
| 3,976,096 A | | 8/1976 | Kass et al. ............... | 137/493.2 |
| 4,016,904 A | * | 4/1977 | Gordon .................... | 137/493.9 |
| 4,580,596 A | * | 4/1986 | Stehling ..................... | 137/523 |
| 4,747,475 A | * | 5/1988 | Hagwood et al. ......... | 137/493.9 |
| 5,404,904 A | * | 4/1995 | Glaser ......................... | 137/539 |
| 6,305,412 B1 | | 10/2001 | Steele ...................... | 137/493.4 |

FOREIGN PATENT DOCUMENTS

| | | |
|---|---|---|
| DE | 206227 | 7/1907 |
| DE | 558309 | 9/1932 |
| DE | 290933 A5 | 6/1991 |
| DE | 19643041 | 4/1998 |
| FR | 1601038 | 10/1981 |
| GB | 992232 | 5/1965 |
| WO | WO9301435 | 1/1993 |
| WO | WO03074912 A | 9/2003 |

OTHER PUBLICATIONS

PCT International Search Report dated May 27, 2003.
German Search Report dated Feb. 20, 2003.

* cited by examiner

*Primary Examiner*—Stephen M. Hepperle
(74) *Attorney, Agent, or Firm*—Tarolli, Sundheim, Covell & Tummino LLP

(57) ABSTRACT

The invention relates to a combined check and pressure control valve (10), comprising a check valve element (34) which is adjustable between an opened position and a closed position, and a pressure control valve element (42) which on exceeding a predetermined pressure can be lifted off a valve seat (40), so that at least one outflow channel is opened, characterized in that the check valve element (34) is a valve plate which in the closed position lies against at least one annular sealing seat (30, 32), which is impressed in a thin-walled component, preferably a sheet metal part (22).

14 Claims, 1 Drawing Sheet

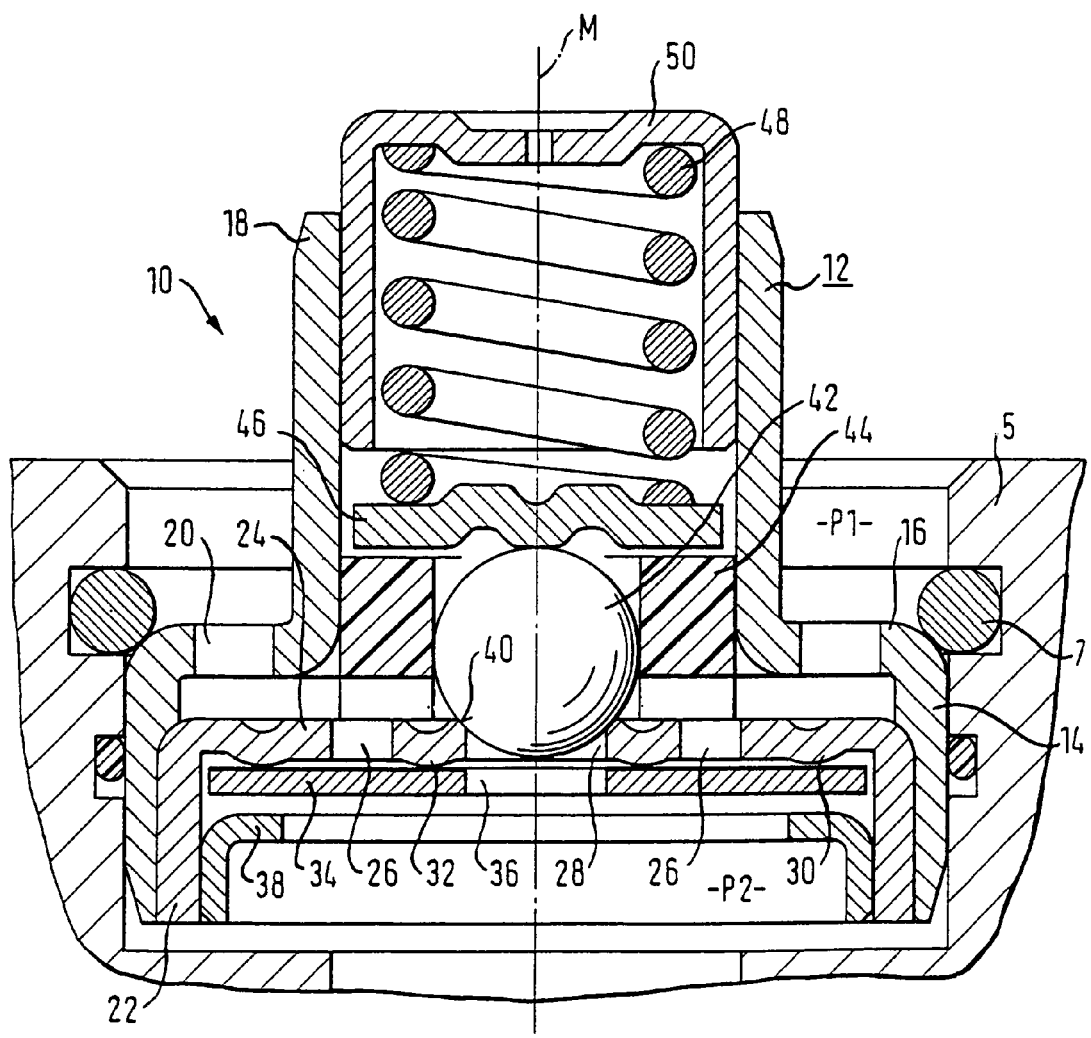

COMBINED CHECK/PRESSURE CONTROL VALVE

The invention relates to a combined check and pressure control valve, comprising a check valve element which is adjustable between an opened position and a closed position, and a pressure control valve element which on exceeding a predetermined pressure can be lifted off a valve seat so that an outflow channel is opened.

Such a valve combines a check valve with a pressure control valve in one single assembly. When a fluid pressure is present in a first direction, the check valve element is in its opened position, so that a through flow of fluid is possible. When, on the other hand, the fluid pressure acts in the opposite, second direction, the check valve element is moved into the closed position, so that a through flow of fluid is prevented. Only when the pressure acting in the second direction exceeds a predetermined value is the pressure control valve element lifted off its valve seat, so that a through flow of fluid is possible there.

The check and pressure control valves known in the prior art have a comparatively complex construction and require expensively produced individual components. The object of the invention therefore consists in providing a combined check and pressure control valve, which consists of individual components which are simple to produce, and which can be installed in a simple manner.

For this purpose, in a combined check and pressure control valve of the type initially mentioned, provision is made that the check valve element is a valve plate which in the closed position lies against at least one annular sealing seat, which is impressed in a thin-walled component, preferably a sheet metal part. In this way, this results in low manufacturing costs both for the valve plate and also for the sealing seat.

Preferably, two annular sealing seats are provided, which are concentric and between which at least one through-flow opening is provided. In this way, with a small amount of expenditure, a very good sealing effect is provided, because a linear contact between the valve plate and the two sealing seats and hence a comparatively high contact pressure force per unit area is obtained. In addition, provision can be made that the check valve element is a simple plate which is rubberized or coated with rubber. This improves the seal.

The two sealing seats may be impressed in a base of a sheet metal cup, the valve seat of the pressure control valve element also being constructed in this base. In this way, a particularly small structural expenditure is the result.

According to the preferred embodiment of the invention, provision is made that the outflow channel, behind the pressure control valve element, viewed in the direction of flow, runs approximately radially to its direction of displacement. In other words, when the pressure control valve element is open, the fluid does not flow around the latter over a large part of its surface, but rather, after it has passed through the valve seat, it flows approximately radially outwards and hence away from the pressure control valve element. In this way, turbulences and fluctuations in pressure which are unavoidably present in the fluid, are prevented from being transferred to the pressure control valve element and stimulating it into oscillations. This increases the switching precision of the pressure control valve.

Preferably, a guide element is provided for the pressure control valve element and is arranged at a distance from the valve seat. This guide element can surround the pressure control valve element comparatively closely, because the fluid in fact does not have to flow around the pressure control valve element and through the guide element, but rather is directed away therefrom. The guide element provides for as precise a guidance as possible of the pressure control valve element, which has an advantageous effect on the switching precision of the pressure control valve.

In order to achieve as compact a construction as possible, provision is made that the outflow channel is formed between the guide element and the base of the cup. Several outflow channels can also be constructed, and these can be formed in either of the two components.

According to the preferred embodiment of the invention, a pressure spring is provided, which urges the pressure control valve element against the valve seat, a separate spring cup being provided for the pressure spring, so that its prestress is adjustable. This makes it possible, during the installation of the combined check and pressure control valve, to set the opening pressure of the pressure control valve in the desired manner, so that the effects of manufacturing tolerances are compensated.

The check and pressure control valve according to the invention is distinguished in that all the components, with the exception of the two valve elements, the pressure spring and the guide element, consist of thin-walled components, preferably of sheet metal, and are stamped or deep-drawn. In this way, almost all the components of the valve can be produced by simple sheet metal working steps, which leads to low manufacturing costs.

Advantageous developments of the invention will be apparent from the sub-claims.

The invention is described below with the aid of a preferred embodiment, which is illustrated in the single drawing. In this drawing, a check and pressure control valve according to the invention is shown in a longitudinal section.

In the figure, a holding member 5 is shown, in which a combined check and pressure control valve 10 is inserted. This contains a valve body 12, which is fastened in the holding member 5 by means of a retaining ring 7. The valve body 12 is a sleeve-like part made of sheet metal with a holding section 14 extending concentrically to a central axis M, with a through-flow section 16 extending perpendicularly to the central axis M, and with a spring section 18, again extending concentrically to the central axis M. Several through-flow openings 20 are arranged in the through-flow section 16. A valve cup 22 is inserted in the holding section 14 of the valve body 12, which valve cup 22 likewise consists of sheet metal and has a base 24 in which several non-return openings 26 and a pressure relief opening 28 are punched out. A first annular sealing seat 30 extends radially outside the non-return openings 26, which sealing seat 30 is concentric to the central axis M and a second annular sealing seat 32, which is likewise concentric to the central axis M, extends radially inside the non-return openings 26. A check valve element 34, which is constructed here as a rubber-coated valve plate with a central opening 36, can cooperate with the two sealing seats 30, 32. In order to prevent the check valve element 34 from moving excessively far away from the two sealing seats 30, 32, a stop ring 38 is provided, which is arranged inside the valve cup.

The edge of the pressure relief opening 28, which lies on the side of the base 24 opposite the sealing seats 30, 32, forms a valve seat 40, with which a pressure control valve element 42 cooperates, which is constructed here as a valve ball. To guide the pressure control valve element 42, a guide element 44 is provided, which is constructed here as a plastic ring which is inserted in the spring section 18 of the valve body 12. A spring plate 46 lies on the side of the pressure control valve element 42 facing away from the valve seat 40, against which spring plate 46 a pressure spring 48 rests. The end of the pressure spring 48 facing away from the spring plate 46 rests against the base of a spring cup 50, which is inserted in the spring section 18 of the valve body 12. On the base of the spring cup, a ventilation opening is provided, which ensures a ventilation of the spring cup and prevents a build-up of pressure in the spring cup.

Apart from the check valve element 34, the pressure control valve element 42, the guide element 44 and the pressure spring 48, all the components of the described check and pressure control valve consist of sheet metal. These components are deep-drawn and/or punched. The sealing seats 30, 32 are impressed from the direction of their rear face in the base 24 of the valve cup 22. During assembly, the individual parts can be secured one into the other in any suitable manner, for example by pressing, crimping or spot-welding. During installation of the spring cup 50, the prestress of the pressure spring 48 can be monitored so that the spring cup 50 is not fastened in the spring section 18 of the valve body 12 until the desired prestress has been reached.

The described check and pressure control valve separates a side with a pressure P1 from a side with a pressure P2. As long as the pressure P1 is greater than the pressure P2, the check valve element 34 is pressed away from the two sealing seats 30, 32 against the stop ring 38, so that the fluid can flow through the through-flow openings 20, the non-return openings 26 and the central opening 36 through the check and pressure control valve. If, on the other hand, the pressure P2 is greater than the pressure P1, the check valve element 34 is pressed against the two sealing seats 30, 32, so that the non-return opening 26 is sealed. As long as the pressure control valve element 42 lies against the valve seat 40, no through-flow of fluid is possible. Only when the pressure P2 is able to lift the pressure control valve element 42 off the valve seat 40, contrary to the action of the pressure spring 48, does the fluid flow through the gap between the valve seat 40 and the pressure control valve element 42 and then, with respect to the central axis M, radially outwards between the base 24 of the valve cup 22 and the guide element 44 to the through-flow openings 20. As the fluid in this state does not flow completely around the pressure control valve element 42, but rather only over a very small part of the surface thereof and then subsequently radially away therefrom, the turbulences and pressure fluctuations present in the fluid are not able to affect the pressure control valve element 42, which leads to a high switching precision.

The invention claimed is:

1. A combined check and pressure control valve (10), comprising a check valve element (34) which is adjustable between an opened position and a closed position, and a pressure control valve element (42) which on exceeding a predetermined pressure can be lifted off a valve seat (40), so that at least one outflow channel is opened, the check valve element (34) comprising a valve plate which in the closed position lies against at least one annular sealing seat (30, 32), said annular sealing seat (30, 32) being formed by an impression in a thin-walled sheet metal part (22).

2. The combined check and pressure control valve according to claim 1, wherein two annular sealing seats (30, 32) are provided, which are concentric and between which at least one non-return opening (26) cooperating with the check valve element (34) is provided.

3. The combined check and pressure control valve according to claim 1, the check valve element (34) is a plate coated with rubber.

4. The combined check and pressure control valve according to claim 1, wherein the thin-walled sheet metal part comprising the annular sealing seat (30, 32) is a base (24) of a valve cup (22).

5. The combined check and pressure control valve according to claim 4, wherein the valve seat (40) of the pressure control valve element (42) is also constructed in the base (24) of the valve cup (22).

6. The combined check and pressure control valve according to claim 1, wherein the outflow channel, viewed in the direction of flow, runs behind the valve seat (40), radially with respect to the direction of lifting off of the pressure control valve element (42).

7. The combined check and pressure control valve according to claim 4, wherein a guide element (44) for the pressure control valve element (42) is arranged at a distance from the valve seat (40), the outflow channel being formed between the guide element (44) and the base (24) of the valve cup (22).

8. The combined check and pressure control valve according to claim 1, wherein a pressure spring (48), which urges the pressure control valve element (42) against the valve seat (40), and a separate spring cup (50) for the pressure spring (48) are provided, so that a prestress of the pressure control valve element (42) is adjustable.

9. The combined check and pressure control valve according to claim 8, wherein a vent opening is provided in the spring cup (50).

10. The combined check and pressure control valve according to claim 1 including a guide element (44) for the pressure control valve element (42), a pressure spring (48), which urges the pressure control valve element (42) against the valve seat is provided, wherein all the components, with the exception of the two valve elements (34, 42), the pressure spring (48) and the guide element (44), are made of sheet metal by punching or deep-drawing.

11. The combined check and pressure control valve according to claim 1 including a valve body (12), said sheet metal part (22) being positioned within said valve body (12), wherein said sheet metal part (22) does not move within said valve body (12).

12. The combined check and pressure control valve according to claim 5, wherein said base (24) consist of one piece.

13. The combined check and pressure control valve according to claim 1, wherein the flow of fluid does not contact said pressure control valve (42) and flow halfway around said pressure control valve (42) in the direction of the lifting off of the pressure control valve element (42).

14. A combined check and pressure control valve (10), comprising a check valve element (34) which is movable between an opened position and a closed position, and a pressure control valve element (42) which when exposed to a predetermined pressure can be lifted off a valve seat (40) to open at least one outflow channel, the check valve element (34) comprising a valve plate which in the closed position lies against at least one annular sealing seat (30, 32), said annular sealing seat (30, 32) comprising a ring shaped projection projecting from one side of a thin-walled sheet metal part (22) opposite an impression formed in an opposite side of said thin-walled sheet metal part.

* * * * *